(12) United States Patent
Henrikson et al.

(10) Patent No.: US 8,392,502 B2
(45) Date of Patent: Mar. 5, 2013

(54) SYSTEM AND METHOD FOR EFFECTING CONFERENCE CALLING

(75) Inventors: Eric Harold Henrikson, Redmond, WA (US); Anne Yin-Fee Lee, Naperville, IL (US)

(73) Assignee: Alcatel Lucent, Paris (FR)

( * ) Notice: Subject to any disclaimer, the term of this patent is extended or adjusted under 35 U.S.C. 154(b) by 1051 days.

(21) Appl. No.: 10/122,282

(22) Filed: Apr. 12, 2002

(65) Prior Publication Data
US 2003/0195930 A1 Oct. 16, 2003

(51) Int. Cl.
*G06F 15/16* (2006.01)
*H04M 3/42* (2006.01)
*H04L 12/16* (2006.01)

(52) U.S. Cl. ........ 709/204; 709/201; 709/202; 709/203; 709/205; 709/217; 709/218; 709/219; 709/226; 709/227; 379/202.01; 379/203.01; 379/204.01; 379/205.01; 370/260; 370/261; 370/262; 370/263; 370/264; 715/751; 715/753

(58) Field of Classification Search .......... 709/204–207, 709/217, 226, 227, 201, 202, 203; 715/733, 715/751, 753, 758; 379/202.01, 204.01, 379/203.01, 205.01; 348/14.08–14.09; 370/259, 370/389, 352, 260–264
See application file for complete search history.

(56) References Cited

U.S. PATENT DOCUMENTS

| | | | | |
|---|---|---|---|---|
| 5,375,068 A * | 12/1994 | Palmer et al. | ................. | 709/204 |
| 5,495,483 A * | 2/1996 | Grube et al. | ................. | 370/341 |
| 5,521,906 A * | 5/1996 | Grube et al. | ................. | 370/252 |
| 5,563,882 A * | 10/1996 | Bruno et al. | ................. | 370/260 |
| 5,594,859 A * | 1/1997 | Palmer et al. | ................. | 715/756 |
| 5,608,653 A * | 3/1997 | Palmer et al. | ................. | 709/204 |
| 5,608,725 A * | 3/1997 | Grube et al. | ................. | 370/338 |
| 5,844,979 A * | 12/1998 | Raniere et al. | .......... | 379/202.01 |
| 5,916,302 A * | 6/1999 | Dunn et al. | ................. | 709/204 |
| 5,996,003 A * | 11/1999 | Namikata et al. | ............ | 709/205 |
| 6,020,915 A * | 2/2000 | Bruno et al. | ............... | 348/14.09 |
| 6,061,440 A * | 5/2000 | Delaney et al. | .......... | 379/202.01 |
| 6,105,054 A * | 8/2000 | Kawashima | .................. | 709/204 |
| 6,275,575 B1 * | 8/2001 | Wu | .......................... | 379/202.01 |
| 6,373,817 B1 * | 4/2002 | Kung et al. | .................... | 370/217 |
| 6,373,936 B1 * | 4/2002 | Raniere et al. | .......... | 379/202.01 |
| 6,411,988 B1 * | 6/2002 | Tafoya et al. | ................. | 709/204 |
| 6,424,711 B1 * | 7/2002 | Bayless et al. | .......... | 379/355.09 |
| 6,473,858 B1 * | 10/2002 | Shimomura et al. | ......... | 713/150 |
| 6,519,571 B1 * | 2/2003 | Guheen et al. | ................. | 705/14 |
| 6,520,646 B2 * | 2/2003 | Rodriguez et al. | ............. | 353/69 |
| 6,574,674 B1 * | 6/2003 | May et al. | .................... | 719/310 |
| 6,583,806 B2 * | 6/2003 | Ludwig et al. | ............ | 348/14.08 |
| 6,584,493 B1 * | 6/2003 | Butler | ........................... | 709/204 |
| 6,615,166 B1 * | 9/2003 | Guheen et al. | .................. | 703/27 |
| 6,615,239 B1 * | 9/2003 | Berstis | ......................... | 709/204 |
| 6,628,767 B1 * | 9/2003 | Wellner et al. | .......... | 379/202.01 |

(Continued)

*Primary Examiner* — Khanh Dinh
*Assistant Examiner* — Saket K Daftuar
(74) *Attorney, Agent, or Firm* — Carmen Patti Law Group, LLC

(57) ABSTRACT

A system for effecting conference calling in a telecommunication network includes: (a) a plurality of subscriber units coupled with the telecommunication network; and (b) a conference control unit coupled with the telecommunication network. The conference control unit responds to a request message from a requesting subscriber unit to effect coupling of a conference-set of subscriber units in a conference calling configuration. The conference control unit controls inclusion in the conference-set by respective subscriber units. The system may provide that the conference control unit provides and controls conferencing services for the conference-set of subscriber units.

14 Claims, 3 Drawing Sheets

U.S. PATENT DOCUMENTS

| | | | |
|---|---|---|---|
| 6,697,858 B1 * | 2/2004 | Ezerzer et al. | 709/224 |
| 6,704,769 B1 * | 3/2004 | Comstock et al. | 709/204 |
| 6,717,607 B1 * | 4/2004 | Lauper et al. | 348/14.08 |
| 6,721,410 B1 * | 4/2004 | Will | 379/202.01 |
| 6,754,323 B1 * | 6/2004 | Chang et al. | 379/205.01 |
| 6,760,750 B1 * | 7/2004 | Boneh et al. | 709/204 |
| 6,772,436 B1 * | 8/2004 | Doganata et al. | 725/106 |
| 6,785,709 B1 * | 8/2004 | Pendakur | 709/204 |
| 6,795,106 B1 * | 9/2004 | Cooper | 348/14.08 |
| 6,819,752 B2 * | 11/2004 | Raniere et al. | 379/202.01 |
| 6,850,266 B1 * | 2/2005 | Trinca | 348/14.09 |
| 6,850,985 B1 * | 2/2005 | Giloi et al. | 709/230 |
| 6,851,053 B1 * | 2/2005 | Liles et al. | 713/168 |
| 6,888,803 B1 * | 5/2005 | Gentry et al. | 370/259 |
| 7,072,336 B2 * | 7/2006 | Barany et al. | 370/389 |
| 7,085,260 B2 * | 8/2006 | Karaul et al. | 370/352 |
| 7,260,641 B2 * | 8/2007 | Decker et al. | 709/233 |
| 7,283,519 B2 * | 10/2007 | Girard | 370/353 |
| 2002/0169832 A1 * | 11/2002 | Lee et al. | 709/205 |
| 2002/0173319 A1 * | 11/2002 | Fostick | 455/466 |
| 2002/0176404 A1 * | 11/2002 | Girard | 370/352 |
| 2003/0119495 A1 * | 6/2003 | Hanninen et al. | 455/422 |
| 2003/0208536 A9 * | 11/2003 | Lee et al. | 709/204 |
| 2004/0218744 A1 * | 11/2004 | Nguyen et al. | 379/202.01 |

* cited by examiner

SYSTEM AND METHOD FOR EFFECTING CONFERENCE CALLING

BACKGROUND OF THE INVENTION

The present invention is directed to a system and method for effecting conference calling in a telecommunication network. In particular, the present invention provides a network-based conferencing controller, preferably embodied in a server apparatus that supports and controls conferencing services and participation among a plurality of subscriber or calling units. Representative conferencing services contemplated for control and support using the system of the present invention include text chat, file transfer, shared whiteboard, shared application or presentation, and other conferencing services.

Prior art conferencing devices or systems use significant amounts of transport bandwidth, memory and computing capacity resident at respective subscriber units, or calling units, for supporting conferencing functions involved in a given conference session. There is a need for a more efficient conferencing system that centrally supports operation of and participation in conferencing. This is especially true for subscriber units with wireless access. Such centralized control and support permits less-capable calling units (e.g., calling units having lesser memory capacity or lesser computing capacity) to participate more fully in conferencing than can be effected using presently available conferencing systems. By way of example, wireless personal digital assistant (PDA) calling units may enjoy fuller participation in conferencing when conferencing is centrally supported and controlled.

There is a need for improved efficiency in conferencing operations in order that lesser-capable calling units may participate more fully in conferencing operations. The invention advantageously reduces bandwidth utilization as compared with prior art conferencing services or systems and provides improved efficiency sufficient to permit improved participation by lesser-capable calling units over participation that has been heretofore available.

SUMMARY OF THE INVENTION

A system for effecting conference calling in a telecommunication network includes: (a) a plurality of subscriber units coupled with the telecommunication network; and (b) a conference control unit coupled with the telecommunication network. The conference control unit responds to a request message from a requesting subscriber unit to effect coupling of a conference-set of subscriber units in a conference calling configuration. The conference control unit controls inclusion in the conference-set by respective subscriber units. The conference control unit accepts data streams from multiple sources, such as subscriber units, for a particular application and generates a single data stream output to each subscriber unit. The system may provide that the conference control unit provides and controls conferencing services for the conference-set of subscriber units.

It is therefore an object of the present invention to provide a system and method for effecting conference calling that offers improved efficiency in conferencing operations.

It is a further object of the present invention to provide a system and method for effecting conference calling that permits lesser-capable calling units to participate in conferencing operations.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
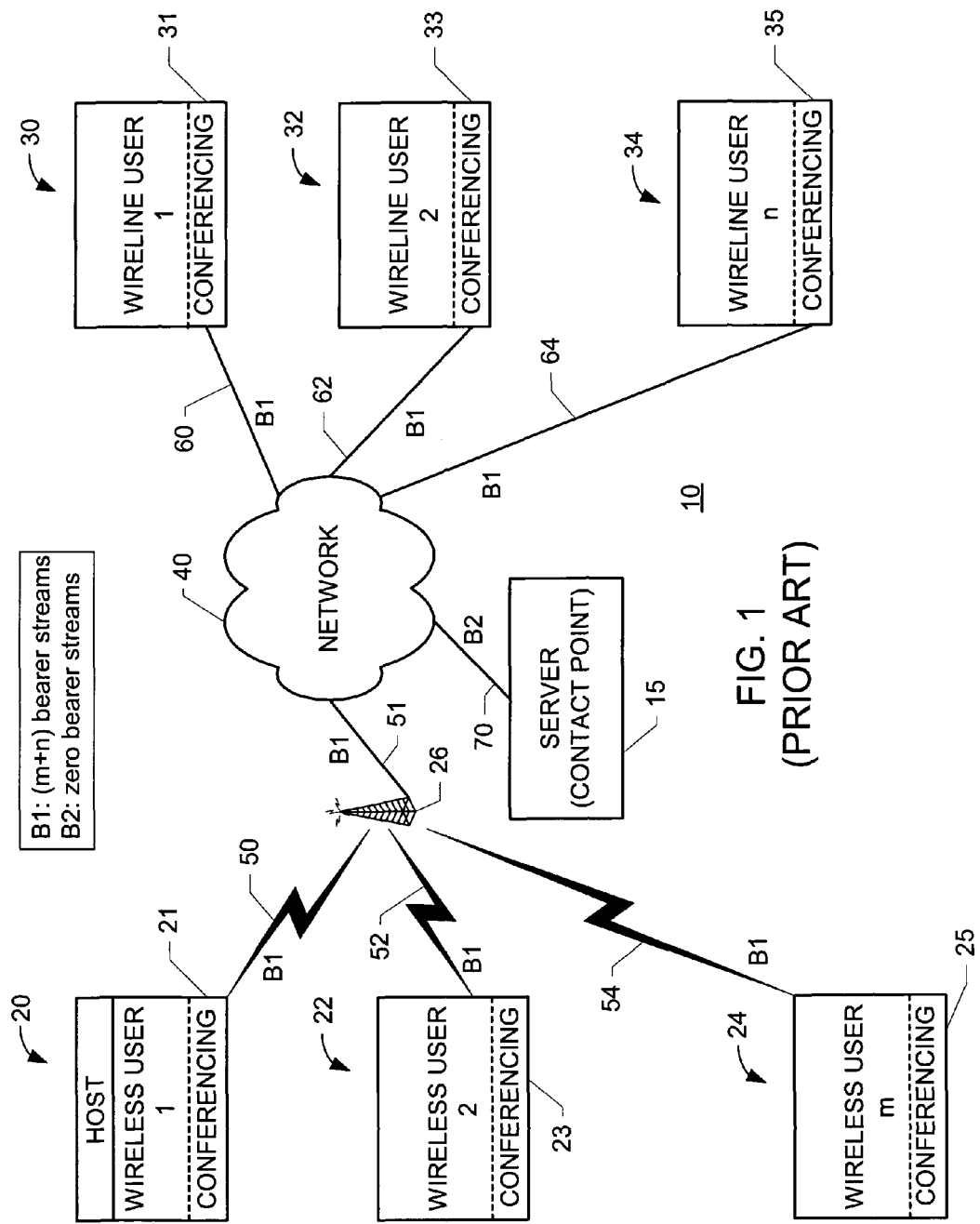
FIG. 1 is a schematic drawing illustrating a prior art implementation of conference calling.

FIG. 1 is a schematic drawing illustrating a prior art implementation of conference calling. In FIG. 1, a conference calling system 10 includes a plurality of wireless users 20, 22, 24. Wireless users 20, 22, 24 are also designated Wireless User 1 (20), Wireless User 2 (22) and Wireless User m (24). The indicator "m" is employed to signify that there is no particular limit to the number of wireless users that may be included in conference calling system 10. Conference calling system 10 also includes a plurality of wireline users 30, 32, 34. Wireline users 30, 32, 34 are also designated Wireline User 1 (30), Wireline User 2 (32) and Wireline User n (34). The indicator "n" is employed to signify that there is no particular limit to the number of wireline users that may be included in conference calling system 10.

Wireline users 30, 32, 34 are communicatingly coupled with a telecommunication network 40 via wireline connections 60, 62, 64. Wireless users 20, 22, 24 are communicatingly coupled with telecommunication network 40 via wireless connections 50, 52, 54 with a wireless communication access tower 26. Wireless communication access tower 26 is coupled with network 40 via a wireline connection 51. Each wireless user may access the network by a different wireless communication access tower. For the sake of simplicity only one communication access tower is shown in FIG. 1. Each of wireless users 20, 22, 24 and wireline users 30, 32, 34 are equipped with a conferencing capability, generally in the form of software, and perhaps also including hardware, computing capability and memory capacity. Thus, wireless user 20 has a conferencing capability 21. Wireless user 22 has a conferencing capability 23. Wireless user 24 has a conferencing capability 25. Wireline user 30 has a conferencing capability 31. Wireline user 32 has a conferencing capability 33. Wireline user 34 has a conferencing capability 35. One of the subscribing units among wireless users 20, 22, 24 and wireline users 30, 32, 34 acts to host the conference call arrangement. In the exemplary arrangement illustrated in FIG. 1, wireless user 20 is host. However, each other subscriber unit participating in a conference calling arrangement must also have conferencing capability; it is the respective conferencing capabilities 21, 23, 25, 31, 33, 35 that carry out the conferencing function in conference calling system 10.

The host (wireless user 20 in FIG. 1) controls entry to a conference calling arrangement. A server 15 is commonly required to provide contact information for the host to add parties to the conference. Server 15 is not involved with the handling of payload in the data streams involved with a conference. Server 15 is coupled with network 40 via a wireline connection 70. Various data conferencing functions may be carried out in conference calling system 10, but they require participation by and among the various conferencing capabilities 21, 23, 25, 31, 33, 35. Such a requirement for a respective conferencing capability 21, 23, 25, 31, 33, 35 among the various subscriber units 20, 22, 24, 30, 32, 34 contributes to the cost and complexity of each subscriber unit 20, 22, 24, 30. 32, 34 because significant memory capacity and computing capacity are required to support conferencing activities. Moreover, the complexity of connection with and data transfer required among respective conferencing capabilities 21, 23, 25, 31, 33, 35 during conferencing operations contributes to a less robust connections and consequent increased susceptibility to interruption of calls, especially with respect to wireless users 20, 22, 24. The traffic load associated with various wireline users 20, 22, 24 and wireline users 30, 32, 34 during conferencing operations is indicated for each wireless connection 50, 52, 54 and wireline connection 51, 60, 62, 64. Wireline connection 70 carries zero bearer streams. That is, server 15 provides only addressing information or similar "overhead" information for establishing conferencing calls; no payload is associated with or included in traffic borne by wireline connection 51. Thus, during conferencing operations, each of wireless connections 50, 52, 54 and wireline connection 51 carries (m+n) bearer streams. A bearer stream is a stream of traffic that includes or bears information, sometimes referred to as payload, among the information in the traffic. Thus, in the exemplary prior art conference calling system 10 (FIG. 1), there are (m+n−1) data streams sent from host wireless user 20 in controlling a conference application in order that all other conference participants may receive a copy of the data. Also, there are (m+n−1) data streams received at each conference participant for any conference application that allows data to be sent from each user, such as a shared whiteboard application.

There is a need for a conferencing arrangement, preferably embodied in a network-based conferencing server apparatus, that can support voice conferencing and data conferencing operations among a plurality of subscriber or calling units that reduces the amount of memory and computing resources required of each participating subscriber unit in a conference. Such a network-based conferencing arrangement can advantageously reduce bandwidth requirements for carrying on a conference call as compared with presently available conference calling systems that require significant conferencing capability resident at each calling unit participating in a conference call, as in the case of system 10 (FIG. 1).

Figure 2:
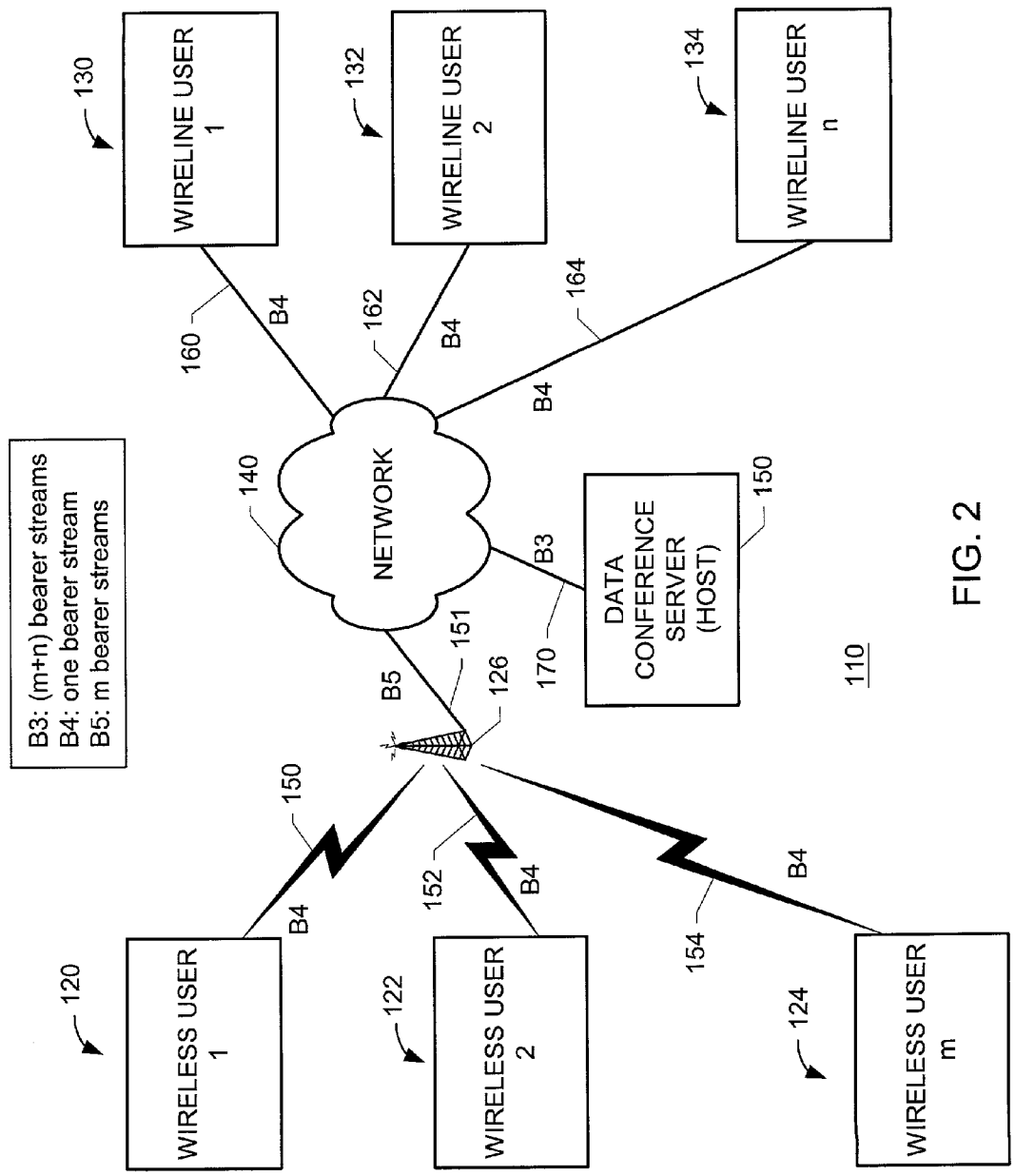
FIG. 2 is a schematic diagram illustrating implementation of conference calling according to the present invention.

FIG. 2 is a schematic diagram illustrating implementation of conference calling according to the present invention. In FIG. 2, a conference calling system 110 includes a plurality of wireless users 120, 122, 124. Wireless users 120, 122, 124 are also designated Wireless User 1 (120), Wireless User 2 (122) and Wireless User m (124). The indicator "m" is employed to signify that there is no particular limit to the number of wireless users that may be included in conference calling system 110. Conference calling system 110 also includes a plurality of wireline users 130, 132, 134. Wireline users 130, 132, 134 are also designated Wireline User 1 (130), Wireline User 2 (132) and Wireline User n (134). The indicator "n" is employed to signify that there is no particular limit to the number of wireline users that may be included in conference calling system 110.

Wireline users 130, 132, 134 are communicatingly coupled with a telecommunication network 140 via wireline connections 160, 162, 164. Wireless users 120, 122, 124 are communicatingly coupled with telecommunication network 140 via wireless connections 150, 152, 154 via a wireless communication access tower 126. Wireless communication access tower 126 is coupled with network 140 via a wireline connection 151. Each wireless user may access the network by a different wireless communication access tower. For the sake of simplicity only one communication access tower is shown in FIG. 1.

A network-based data conferencing control unit, or conferencing host 150 is communicatingly coupled with network 140. Conferencing host 150 is preferably embodied in a server apparatus, but may reside in a computing apparatus such as a mainframe computer, a personal computer (PC) or another computing apparatus coupled with network 140. Conferencing host 150 is coupled with network 140 via a wireline 170 and effects and maintains conferencing arrangements and operations network-wide for all subscriber units or calling units coupled with network 140, including wireless users 120, 122, 124 and wireline users 130, 132, 134. By way of example, and not by way of limitation, wireline users may include Internet protocol (IP) telephony devices as well as Dual Tone Multiple Frequency (DTMF) phone instruments communicating via ISDN (Integrated Services Digital Network) lines, optical lines or other communication connections. Wireless users 120, 122, 124 may include, for example, time division multiple access (TDMA), code division multiple access (CDMA), wireless local area networks (LANs), UMTS (Universal Mobile Telecommunications Systems) protocol sometimes referred to as wideband CDMA, or other protocols for establishing and maintaining calls. An initiating caller (any one of subscriber units 120, 122, 124, 130, 132, 134) may connect via network 140 with conferencing host 150 to initiate a conference call arrangement. Conferencing host 150 includes a calling bridge or other configuration consistent with establishing and maintaining selected subscriber units in a conference calling arrangement.

The traffic load associated with various wireline users 120, 122, 124 and wireline users 130, 132, 134 during conferencing operations is indicated for each wireless connection 150, 152, 154 and wireline connection 151, 160, 162, 164. Wireline connection 170 carries (m+n) bearer streams. Each of wireless connections 150, 152, 154 and wireline connections 160, 162, 164 carries one bearer stream. Wireline connection 151 carries m bearer streams. A bearer stream is a stream of traffic that includes or bears information, sometimes referred to as payload, among the information in the traffic. Thus, in the exemplary prior art conference calling system 110 (FIG. 2), there is a single data stream sent from the current user in control of an application (e.g., wireless user 20) to conference control unit 150. Conference control unit 150 sends a copy of the data to all the other users. Only conference control unit 150 receives the multiple (m+n) bearer streams for any application that allows data to be sent from each user, so that only wireline connection 170 carries (m+n) bearer streams.

Admission to an ongoing conference call is preferably controlled by conference host 150. In the alternative, any subscriber unit involved in a conference call may include an additional caller in an ongoing conference call. Preferably, new callers may be added to an extant conference call only by conference host 150 in response to a request for such admission submitted to conference host 150 by a subscriber participating in the extant conference call, or by another subscriber unit (not shown in FIG. 2). In yet another alternative arrangement, conference host 150 may be programmed to include a roster of selected calling units upon initially establishing a conference call.

Thus, for example, a party desiring to establish a conference call may dial-in access to conference host 150, for example, using a common 10-digit telephone number (e.g., an E.164 number) or a URL (Universal Resource Locator) address commonly used to access a web page via the Internet. Once connection is established with conference host 150, a conference call setup may be established with conference host 150. Conference host 150 preferably keeps a list of participating calling units involved in the extant conference call and may display such a participant list on a display unit at participating caller's sites, or loci.

Alternatively, as described briefly above, a conference call participant may dial into conference host 150 (using a 10-digit phone number) or access an appropriate web page associated with conference host 150 (using a URL address) to effect adding an additional caller to an extant conference call. Once connection is established with conference host 150, then conference host 150 may present an interface display at the caller's site to effect entering required information for including an additional caller. In yet another alternate embodiment of the present invention, a prior art conferencing system (e.g., system 10; FIG. 1) may be resident at the caller seeking to add a new participant to an extant conference call. The present invention may be configured to accommodate including a caller conferenced in using a prior art conferencing capability in the network-based conference established by conference host 150.

Preferably, conference calling system 110 is configured so that any participant in an extant conference call may place a request with conference host 150 to include an additional caller. It would be preferable to initiate such contact with conference host 150 using the desired new participant's phone number or other identifier. Conference host 150 will then use the identifier information used for making a request to add a new participant to contact the proposed participant. The proposed new participant may then elect whether to participate in the extant conference call or decline to participate. If the proposed new participant opts to accept inclusion in the extant conference call, conference host 150 effects connection appropriate to include the new participate in the extant conference call.

If conference host 150 is to be programmed to include a roster of selected calling units upon initially establishing a conference call (as briefly described earlier), conference host 150 must call all predetermined participants at a predetermined time to establish the desired conference call arrangement. In such a circumstance, conference host 150 dials (or otherwise enters) an identifier, such as a phone number (e.g., a 10-digit, E.164 number) or a URL address, for each predetermined participant. As each respective participant answers the initiating call, conference host 150 establishes a conference user interface for display at the respective new participant's site. The conference user interface display may be generated locally at the respective new participant's site or may be provided by conference host 150.

Conference host 150 is preferably configured for establishing data conferencing arrangements among conference call participants. Thus, conference host 150 permits any subset of participants in a conference call to exchange text messages among themselves or to all conference call participants. A text message is preferably sent by an originating participant to conference host 150 with an address list indicating intended recipients for the message. Conference host 150 relays the text message to the indicated intended receivers. This arrangement places the need for computing capacity and communication capacity with conference host 150 for carrying out conferencing operations such as text messaging. Respective calling units 120, 122, 124, 130, 132, 134 therefore require less computing capacity and communicating capacity to participate in conference call operations than are required for participation in such operations in prior art conferencing systems, such as system 10 (FIG. 1).

Conference host 150 provides similar advantages for other data conferencing operations, such as shared whiteboard conferencing. Preferably, any party participating in a conference call may initiate a whiteboard application. Once a whiteboard application is established, participants in the conference call can take turns drawing on the whiteboard by requesting control of the whiteboard from the participant current controlling the whiteboard via conference host 150. As a user draws or writes on the whiteboard, changes on the whiteboard are transferred from the controlling participant's locus to conference host 150 in real time, or in nearly real time. Conference host 150 subsequently sends whiteboard changes to other conference participants. Changes to the whiteboard may be sent by conference host 150 in real time, in nearly real time or in a packetized signal format.

Conference host 150 may also be advantageously employed for other data conferencing operations, such as spreadsheet, word processing or presentation applications. Any of the data conferencing applications may be initiated by any participant from the initiating participant's locus. Once the data conferencing application is established, the initiating participant may opt whether or not to send a saved file associated with the data conferencing application to conference host 150 so that conference host 150 can effect display of the application file to other conference participants. Once a data application is displayed to other conference participants, various participants may take turns editing the extant version of the application file by requesting control of the application file from the currently controlling editing participant. As a respective participant edits an application file, changes effected to the file are transferred by conference host 150 to other participants. The transfer preferably is carried out in real time or in nearly real time, but may be carried out in a packetized format.

Conference host 150 may also be advantageously employed for other conferencing operations that involve data conferencing, such as packetized voice operations and streaming video operations.

Figure 3:
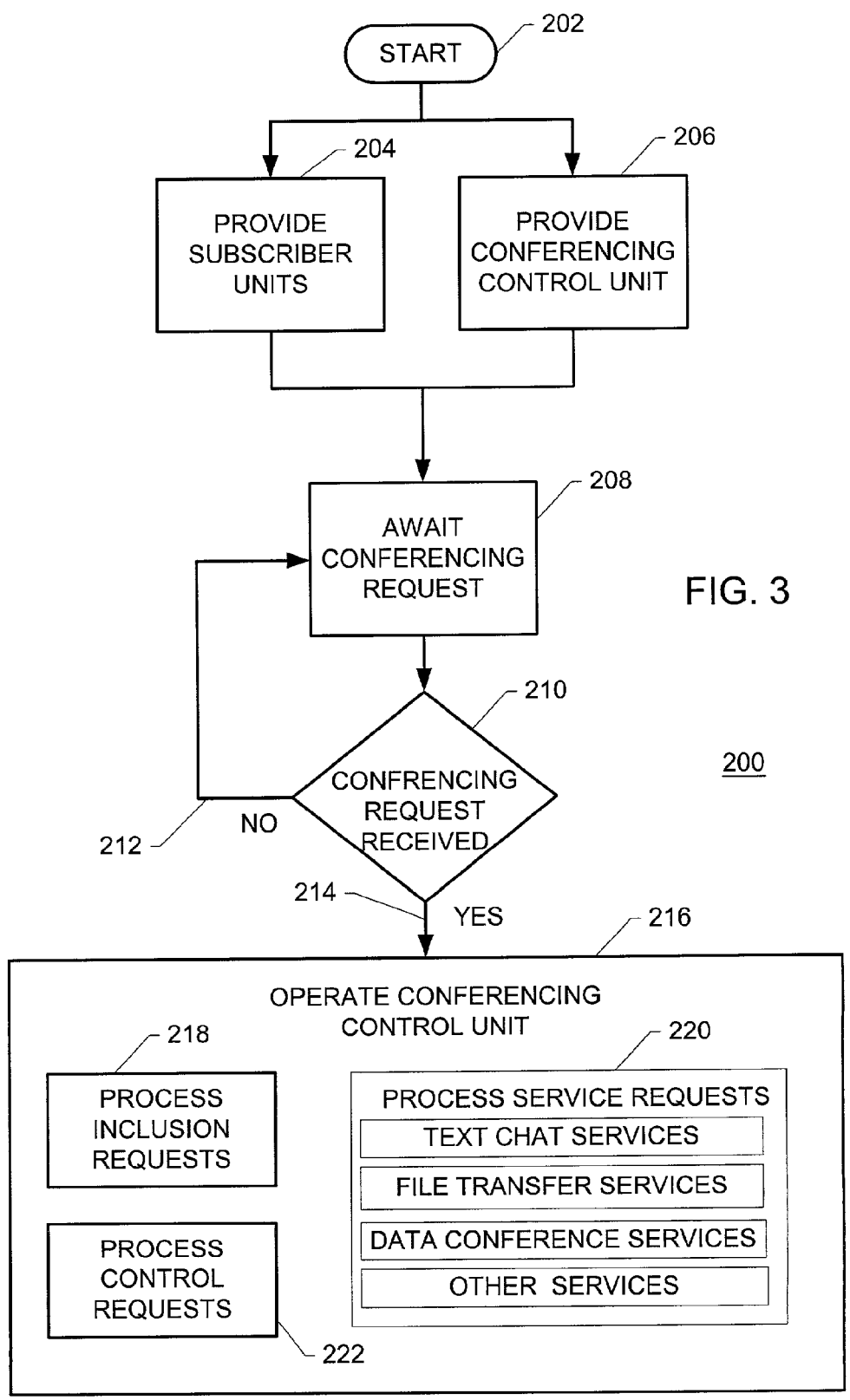
FIG. 3 is a flow diagram illustrating the method of the present invention.

FIG. 3 is a flow diagram illustrating the method of the present invention. In FIG. 3, a method 200 for effecting conference calling in a telecommunication network begins at a START locus 202. Method 200 continues, in no particular order: (1) providing a plurality of subscriber units coupled with the telecommunication network, as indicated by a block 204; and (2) providing a conference control unit coupled with the telecommunication network, as indicated by a block 206. Method 200 continues by awaiting a request for establishing a conference call arrangement, as indicated by a block 208.

As method 200 awaits a conferencing request (block 208) a query is posed, "Has a conferencing request been received?", as indicated by a query block 210. If no conferencing request has been received, method 200 continues from query block 210 via NO response line 212 to return to awaiting a conferencing request (block 208). If a conferencing request has been received, method 200 proceeds from query block 210 via YES response line 214 to operate a conference control unit in response to a request message from a requesting subscriber unit (the conferencing request; block 210), as indicated by a block 216 to effect coupling of a conference-set of subscriber units in a conference calling configuration. The conference calling configuration is preferably set forth in an inclusion request contained in the conferencing request. The conference control unit controls inclusion in the conference calling set by respective subscriber units as indicated by the inclusion request, as indicated by a block 218. The conference control unit further controls processing of other conferencing service requests, including for example establishing and operating text chat services, file transfer services, data conference services and other services, as indicated by a block 220. The conference control unit coordinates the requests from users to control a particular application, as indicated by a block 222.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for effecting conference calling in a internet protocol (IP) network comprising a plurality of subscriber units and a conference control unit coupled with said network, the conference control unit performing a method comprising the steps of:
   (a) receiving a request via an IP call control protocol from a requesting subscriber unit of said plurality of subscriber units to effect coupling of a conference-set of subscriber units of said plurality of subscriber units in a conference calling configuration;
   (b) creating a list of subscriber units in said conference calling; said conference control unit being operable to accommodate a caller conferenced in using a conferencing capability resident at the subscriber unit of the caller;
   (c) adding to said list as additional subscriber units are added to the conference calling set;
   (d) managing the transfer of bearer streams between the subscriber units while providing any of the following applications to the subscriber units in the conference calling set:
      (d1) receiving a text message from one of the subscriber units in the conference call to one or more designated recipients among the subscriber units in the conference calling set, and relaying the text message to the designated recipients;
      (d2) receiving a data file from one of the subscriber units in the conference call with one or more designated recipients among the subscriber units in the conference calling set, and relaying the data file to the designated recipients;
      (d3) receiving a request to initiate a shared whiteboard application from one of the subscriber units in the conference call, receiving data input to the shared whiteboard application from the subscriber unit, and relaying the data in a bearer stream to the other subscriber units in the conference call for display on the subscriber units;
      (d4) receiving a request to initiate a shared data processing application from one of the subscriber units in the conference call, receiving data input to the shared data processing application from the user, and relaying the data in a bearer stream to the other subscriber units in the conference call for display on the subscriber units;
   wherein only an operable connection to the IP network of the conferencing server unit carries a plurality of bearer streams, and such that each operable connection to the IP network of a respective subscriber unit of the plurality of subscriber units carries only a single bearer stream, that is the conference control unit accepting data streams from multiple sources, including subscriber units, for an initiated application and generating a single bearer stream output to each subscriber unit, such that a single data stream is sent from the current subscriber unit in control of the initiated application to the conference control unit, the conference control unit sending a copy of the data to all the other current subscriber units, with only the conference control unit receiving multiple (m+n) bearer streams for any application that allows data to be sent from each user, so that only a wireline connection between the current subscriber unit as conferencing host and the IP network carries (m+n) bearer streams, wherein at least one of said plurality of subscriber unit utilizes wireless communication protocols.

2. The method for effecting conference calling in the internet protocol (IP) network as recited in claim 1 wherein said data processing application includes shared spreadsheet services.

3. The method for effecting conference calling in the internet protocol (IP) network as recited in claim 1 wherein said data processing application includes shared word processor services.

4. The method for effecting conference calling in the internet protocol (IP) network as recited in claim 1 wherein said data processing application includes shared presentation services.

5. The method of claim 1 wherein at least one of said plurality of subscriber units utilizes a Universal Mobile Telecommunications Systems (UMTS) protocol.

6. The method of claim 1 wherein the request from a requesting subscriber further comprises an E.164 number or a universal resource locater (URL) number.

7. The method of claim 1 further comprising the step of
   (e) receiving a request from any subsciber unit in the conference calling set to input data to an initiated shared application; and
   (f) processing the request by transferring control of the initiated shared application to the requesting subscriber unit.

8. A method for effecting conference calling in a internet protocol (IP) network comprising a plurality of subscriber units and a conference control unit coupled with said network; the conference control unit performing a method comprising the steps of:
   (a) receiving a request via an IP call control protocol from a requesting subscriber unit of said plurality of subscriber units to establish a conference call;
   (b) receiving a request from the requesting subscribing unit to add one or more subscriber units to the conference call;
   (d) managing the transfer of bearer streams between the subscriber units while providing any of the following applications to the subscriber units in the conference calling set:
      (d1) receiving a text message from one of the subscriber units in the conference call to one or more designated recipients among the subscriber units in the conference calling set, and relaying the text message to the designated recipients;
      (d2) receiving a data file from one of the subscriber units in the conference call with one or more designated recipients among the subscriber units in the conference calling set, and relaying the data file to the designated recipients;
      (d3) receiving a request to initiate a shared whiteboard application from one of the subscriber units in the conference call, receiving data input to the shared whiteboard application from the subscriber unit, and relaying the data in a bearer stream to the other subscriber units in the conference call for display on the subscriber units;

(d4) receiving a request to initiate a shared data processing application from one of the subscriber units in the conference call, receiving data input to the shared data processing application from the user, and relaying the data in a bearer stream to the other subscriber units in the conference call for display on the subscriber units; wherein only an operable connection to the IP network of the conferencing server unit carries a plurality of bearer streams, and such that each operable connection to the IP network of a respective subscriber unit of the plurality of subscriber units carries only a single bearer stream, that is the conference control unit accepting data streams from multiple sources, including subscriber units, for an initiated application and generating a single bearer stream output to each subscriber unit, such that a single data stream is sent from the current subscriber unit in control of the initiated application to the conference control unit, the conference control unit sending a copy of the data to all the other current subscriber units, with only the conference control unit receiving multiple (m+n) bearer streams for any application that allows data to be sent from each user, so that only a wireline connection between the current subscriber unit as conferencing host and the IP network carries (m+n) bearer streams, wherein at least one of said plurality of subscriber unit utilizes wireless communication protocols.

9. The method for effecting conference calling in the internet protocol (IP) network as recited in claim 8 wherein said data processing application includes shared spreadsheet services.

10. The method for effecting conference calling in the internet protocol (IP) network as recited in claim 8 wherein said data processing application includes shared word processor services.

11. The method for effecting conference calling in the internet protocol (IP) network as recited in claim 8 wherein said data processing application includes shared presentation services.

12. The method of claim 8 wherein at least one of said plurality of subscriber units utilizes a Universal Mobile Telecommunications Systems (UMTS) protocol.

13. The method of claim 8 wherein the request from a requesting subscriber further comprises an E.164 number or a universal resource locater (URL) number.

14. The method of claim 8 further comprising the step of
(e) receiving a request from any subsciber unit in the conference calling set to input data to an initiated shared application; and
(f) processing the request by transferring control of the initiated shared application to the requesting subscriber unit.

* * * * *